United States Patent
Lockhart

(10) Patent No.: US 10,091,281 B1
(45) Date of Patent: Oct. 2, 2018

(54) MULTI-USER APPLICATION HOST-SYSTEM SELECTION SYSTEM

(71) Applicant: Electronic Arts Inc., Redwood City, CA (US)

(72) Inventor: Mitchell James Lockhart, Vancouver (CA)

(73) Assignee: Electronics Arts Inc., Redwood City, CA (US)

( * ) Notice: Subject to any disclaimer, the term of this patent is extended or adjusted under 35 U.S.C. 154(b) by 124 days.

(21) Appl. No.: 15/366,842

(22) Filed: Dec. 1, 2016

(51) Int. Cl.
  G06F 15/16 (2006.01)
  H04L 29/08 (2006.01)
  H04L 12/26 (2006.01)
  A63F 13/358 (2014.01)

(52) U.S. Cl.
  CPC ........ H04L 67/1002 (2013.01); A63F 13/358 (2014.09); H04L 43/08 (2013.01)

(58) Field of Classification Search
  CPC ..... H04L 67/1002; H04L 43/08; A63F 13/358
  USPC ........ 709/203, 213, 219, 226, 231, 244, 250
  See application file for complete search history.

(56) References Cited

U.S. PATENT DOCUMENTS

| | | | |
|---|---|---|---|
| 5,813,913 A | 9/1998 | Berner et al. | |
| 5,894,556 A | 4/1999 | Grimm et al. | |
| 5,961,386 A | 10/1999 | Sawaguchi | |
| 5,964,660 A | 10/1999 | James et al. | |
| 6,012,096 A | 1/2000 | Link et al. | |
| 6,023,729 A | 2/2000 | Samuel et al. | |
| 6,038,599 A | 3/2000 | Black et al. | |
| 6,128,660 A | 10/2000 | Grimm et al. | |
| 6,322,451 B1 | 11/2001 | Miura | |
| 6,641,481 B1 | 11/2003 | Mai et al. | |
| 6,699,125 B2 | 3/2004 | Kirmse et al. | |
| 6,755,743 B1 | 6/2004 | Yamashita et al. | |
| 7,031,473 B2 | 4/2006 | Morais et al. | |
| 7,169,051 B1 | 1/2007 | Mossbarger | |
| 7,240,093 B1 | 7/2007 | Danieli et al. | |
| 7,264,243 B2 | 9/2007 | Yoseloff et al. | |
| 7,287,076 B2 * | 10/2007 | Ewanchuk | H04L 47/15 709/219 |
| 7,288,028 B2 | 10/2007 | Rodriguez et al. | |
| 7,430,719 B2 | 9/2008 | Pettinati et al. | |
| 7,470,197 B2 | 12/2008 | Massey et al. | |
| 7,549,125 B2 | 6/2009 | Dunn et al. | |
| 7,636,719 B2 | 12/2009 | Thompson et al. | |
| 8,360,845 B1 | 1/2013 | Hsu | |
| 8,782,121 B1 | 7/2014 | Chang | |
| 8,882,588 B2 | 11/2014 | Buhr | |

(Continued)

OTHER PUBLICATIONS

Agarwal, S., et al., "Matchmaking for online games and other latency-senstive P2P systems." In ACM SIGCOMM Computer Communication Review, vol. 39, pp. 315-326, ACM, 2009.

(Continued)

*Primary Examiner* — Michael Y Won
(74) *Attorney, Agent, or Firm* — Knobbe, Martens, Olson & Bear, LLP

(57) ABSTRACT

Embodiments of systems and methods disclosed herein relate to selecting an application host system (for example, a server at a data center) to host an instance of a multiplayer video game session that assesses a quality of a connection to the application host system for each of the users who request or are selected to play within the multiplayer video game session.

20 Claims, 5 Drawing Sheets

(56) References Cited

U.S. PATENT DOCUMENTS

| | | | |
|---|---|---|---|
| 9,199,173 | B2 | 12/2015 | Jensen |
| 9,630,113 | B1 | 4/2017 | Jensen |
| 2001/0044339 | A1 | 11/2001 | Cordero et al. |
| 2002/0037767 | A1 | 3/2002 | Ebin |
| 2002/0086732 | A1 | 7/2002 | Kirmse et al. |
| 2002/0195775 | A1 | 12/2002 | Webb et al. |
| 2003/0236878 | A1 | 12/2003 | Egi |
| 2004/0097287 | A1 | 5/2004 | Postrel |
| 2004/0116186 | A1 | 6/2004 | Shim et al. |
| 2004/0143852 | A1 | 7/2004 | Meyers |
| 2004/0192440 | A1 | 9/2004 | Evans et al. |
| 2004/0215756 | A1 | 10/2004 | VanAntwerp et al. |
| 2004/0248652 | A1 | 12/2004 | Massey et al. |
| 2004/0255032 | A1 | 12/2004 | Danieli |
| 2005/0033601 | A1 | 2/2005 | Kirby et al. |
| 2005/0181878 | A1 | 8/2005 | Danieli et al. |
| 2005/0192097 | A1 | 9/2005 | Famham et al. |
| 2006/0121990 | A1 | 6/2006 | O'Kelley, II et al. |
| 2006/0217167 | A1 | 9/2006 | Jubinville et al. |
| 2006/0247055 | A1 | 11/2006 | O'Kelley, II et al. |
| 2006/0258463 | A1 | 11/2006 | Cugno et al. |
| 2006/0287096 | A1 | 12/2006 | O'Kelley, II et al. |
| 2006/0287099 | A1 | 12/2006 | Shaw et al. |
| 2007/0035548 | A1 | 2/2007 | Jung et al. |
| 2008/0311981 | A1 | 12/2008 | Schugar |
| 2010/0197405 | A1 | 8/2010 | Douceur et al. |
| 2010/0273557 | A1 | 10/2010 | Miyaki |
| 2010/0317420 | A1* | 12/2010 | Hoffberg ............ G06Q 30/0207 463/1 |
| 2011/0252079 | A1 | 10/2011 | Werner et al. |
| 2012/0283021 | A1 | 11/2012 | Riego |
| 2013/0045803 | A1 | 2/2013 | Kang et al. |
| 2013/0165234 | A1 | 6/2013 | Hall et al. |
| 2013/0210527 | A1 | 8/2013 | Kim et al. |
| 2013/0262203 | A1 | 10/2013 | Frederick et al. |
| 2013/0288759 | A1 | 10/2013 | Rom et al. |
| 2014/0189065 | A1* | 7/2014 | van der Schaar ....... H04L 67/32 709/219 |
| 2014/0274402 | A1 | 9/2014 | Michel et al. |
| 2015/0011310 | A1* | 1/2015 | Lockton ................ A63F 13/352 463/29 |
| 2015/0148127 | A1 | 5/2015 | Saraf et al. |
| 2015/0375104 | A1* | 12/2015 | Nishar .................... A63F 13/12 463/9 |
| 2016/0005270 | A1 | 1/2016 | Marr et al. |
| 2016/0255139 | A1* | 9/2016 | Rathod .................. H04L 67/22 709/203 |
| 2016/0332081 | A1* | 11/2016 | Marr ....................... A63F 13/63 |
| 2017/0259178 | A1 | 9/2017 | Aghdaie et al. |

OTHER PUBLICATIONS

Agresti, A., et al., "Categorical Data Analysis." Springer, 2011.

Bell, C. E., Weighted matching with vertex weights: An application to scheduling training sessions in NASA space shuttle cockpit simulators. European Journal of Operational Research, 73(3):443-449, 1994.

Berge, C., "Hypergraphs: combinatorics of finite sets", vol. 45. Elsevier, 1984.

Bernhaupt, R., "User experience evaluation in entertainment. In Evaluating User Experience in Games", pp. 3-7. Springer, 2010.

Bradley, R. A., et al., "Rank analysis of incomplete block designs: I. The method of paired comparisons." Biometrika, 39(3/4):324-345, 1952.

Delalleau, E., et al., "Beyond Skill Rating: Advanced Matchmaking in Ghost Recon Online." IEEE Transactions on Computational Intelligence and AI in Games, 4(3):167-177, Sep. 2012.

Drake, D. E., et al., "A simple approximation algorithm for the weighted matching problem." Information Processing Letters, 85(4):211-213, 2003.

Duan, R., et al., "Linear-time approximation for maximum weight matching." Joural of the ACM (JACM), 61(1):1, 2014.

Edmonds, J., "Maximum matching and a polyhedrom with 0, 1-vertices." J. Res. Nat. Bur. Standards B, 69(1965):125-130, 1965.

Edmonds, J., "Paths, trees, and flowers." Canadian Journal of Mathematics, 17(3):449-467, 1965.

Elo, A. E., "The rating of chessplayers, past and present." Arco Pub., 1978.

Ferreira, J., et al., "Data mining techniguques on the evaluation of wireless churn." In ESANN, pp. 483-488, 2004.

Gabow, H. N., "Implementation of algorithms for maximum matching on nonbipratite graphs." 1974.

Gabow, H. N., "A scaling algoritm for weighted matching on general graphs." In Foundations of Computer Science, 1985., 26the Annual Symposium on, pp. 90-100, IEEE, 1985.

Glickman, M. E., "Parameter estimation in large dynamic paired comparison experiments." Applied Statistics, pp. 377-394, 1999.

Grapel, T., et al., "Ranking and Matchmaking." Game Developer Magazine, 25:34, 2006.

Hadiji, F., et al., "Predicting player chrun in the wild." In 2014 IEEE Conference on Computational Intelligence and Games, pp. 1-8, IEEE, 2014.

Herbrich, R., et al., "Trueskill: A bayesian skill rating system." pp. 569-576. Advances in Neural Information Processing Systems, 2006.

Huang, T.-K., et al., A generalized Bradley-Terry model: From group competition to individual skill. In Advances in Neural Information Processing Systems, pp. 601-608, 2004.

Jimenez-Rodriguez, J., et al., Matchmaking and case-based recommendations. 2011.

Lawler, E. L., "Combinatorial Optimization: Networks and Matroids." Courier Corporation, 2001. (Part 1 of 2).

Lawler, E. L., "Combinatorial Optimization: Networks and Matroids." Courier Corporation, 2001. (Part 2 of 2).

Lee, Y., et al., "Measurement and estimation of network QoS among peer Xbox 360 game players." In International Conference on Passive and Active Network Measurement, pp. 41-50. Springer, 2008.

Manweiler, S., et al., "Switchboard: a matchmaking system for multiplayer mobile games." In Proceedings of the 9th international conference on Mobile systems, applications, and services, pp. 71-84. ACM, 2011.

Menke, J. E., et al., "A Bradley-Terry artificial neural network model for individual ratings in gropu competitions." Neural computing and Applications, 17(2): 175-186, 2008.

Minotti, M., Comparing MOBAs: League of Legends vs. Dota 2 vs. Smite vs. Heroes of the Storm. Http://venturebeat.com/2015/07/15/comparing-mobas-league-of-legends-vs-dota-2-vs-smite-vs-heroes-of-the-storm/, 2016. Online; accessed May 2016.

Morik, K., et al., "Analysing customer churn in insurance date-a case study." In European Conferecne on Principles of Data Mining and Knowledge Discovery, pp. 325-336. Springer, 2004.

Myslak. M., et al., "Developing game-structure sensitive matchmaking system for massive-multiplayer online games." In Social Informatics, pp. 200-208. Springer, 2014.

Nguyen, T.-H. D., et al., "Analytics-based AI Techniques for Better Gaming Experience", vol. 2 of Game AI Pro. CRC Press, Boca Raton, Florida, 2015.

Olafsson, S., "Weighted matching in chess tournaments." Journal of the Operational Research Society, 41(1): 17-24, 1990.

Osiakwan, C. N., et al., "The maximum weight perfect matching problem for complete weighted graphs is in pc." In Parallel and Distributed Processing. 1990. Proceedings of the Second IEEE Symposium on, pp. 880-887. IEEE, 1990.

Riskin, E. A., et al., Index assignment for progressive transmission of full-search vector quantization. IEEE Transactions on Image Processing, 3(3):307-312, 1994.

Runge, J., et al., "Churn prediction for high-value players in casual social games." In 2014 IEEE Conference on Computational Intelligence and Games, pp. 1-8, IEEE, 2014.

SuperData. eSports market brief: US accounts for almost half of total viewership. https://www.superdataresearch.com/blog/esports/-brief/, 2016. Online; accessed Mar. 2016.

Tassi, P., "Riot's League of Legends" Reveals Astonishing 27 Million Daily Players, 67 Million Monthly. Http://www.forbes.com/

(56) References Cited

OTHER PUBLICATIONS sites/insertcoin/2014/01/27/riots-league-of-legends-reveals-astonishing-27-million-daily-players-67-million-monthly/#26ff8e543511, 2016. Online; accessed May 2016.

Van Rantwijk, J., "Maximum Weighted Matching." http://jorisvr.nl/article/maximum-matching, 2013. Online; accessed May 2016.

Weber, B. G., et al., Modeling player retention in madden nfl 11. In IAAI. 2011.

Yannakakis, G., et al., Player Modeling. In Artificial and Computational Intelligence in Games, pp. 45-59. 2013.

Moon, S., et al., Prediction of advertiser churn for google adwords. 2010.

Lee et al; Adaptive Server Selection for Large Scale Interactive Online Games. ACM Press, 2004.

International Search Report Application PCT/US/06/18957 dated Aug. 17, 2007.

* cited by examiner

MULTI-USER APPLICATION HOST-SYSTEM SELECTION SYSTEM

BACKGROUND

Video games have become a popular entertainment medium. Some video games are multiplayer games. There are a number of different methods that exist to enable users to play these multiplayer video games with each other. Often, the method used depends on the particular video game and the needs associated therefrom. One method is for the users to connect to a server that can host at least a portion of the video game.

In some cases, multiple servers may exist that can host at least a portion of the video game. Often, the user experience can vary based on the server that is selected. For example, with respect to a particular user computing device, a more geographically distant server may have higher latency than a less geographically distant server. To help offset this variance in latency, often a user will select or be assigned to a server within the same geographic region as the user.

SUMMARY OF DISCLOSURE

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain embodiments of the present disclosure relate to a method of assessing network connections. The method may be performed under the control of one or more hardware computing devices configured with specific computer-executable instructions. The specific computer-executable instructions may be stored in an electronic hardware memory and may include communicating over a network with a first user computing system associated with a first user. Further, the method may include receiving, from the first user computing system, a trigger instruction data packet comprising an electronic indication indicating a request by the first user to play an instance of a video game. In addition, the method may include communicating with a physical data store that is configured to store game participant data structures storing information about users requesting to play the video game. The method may further include identifying a plurality of users to play the instance of the video game. Each user of the plurality of users may be associated with a different user computing system of a plurality of user computing systems. For each user of the plurality of users, the method may include accessing, from the physical data store, a connection statistics data packet storing network connection statistics for the user computing system associated with the user. The network connection statistics may correspond to at least one test communication performed with each data center of a plurality of data centers and the user computing system. Additionally, the method may include executing a first rules engine to generate a score for each data center of the plurality of data centers. Each score may be based at least in part on an assessment of the network connection statistics associated with each user of the plurality of users and the data center. Further, the method may include executing a second rules engine to determine a selected data center from the plurality of data centers based at least in part on the score generated for each data center of the plurality of data centers. Moreover, the method may include generating a data center selection packet storing the selected data center. The data center selection packet may be configured for transmission to at least one user computing system of the plurality of user computing systems. The method may further include transmitting the data center selection packet to a network interface for transmission to the at least one user computing system.

Certain embodiments of the present disclosure relate to a system configured to assess network connections. The system may include an electronic data store configured to store connection statistics for communication between a plurality of user computing systems and a plurality of data centers. Further, the system may include a hardware processor in communication with the electronic data store. The hardware processor may be configured to execute specific computer-executable instructions to at least communicate over a network with a user computing system associated with a user. In addition, the hardware processor may be further configured to receive, from the user computing system, a trigger instruction data packet comprising an electronic indication indicating a request by the user to play an instance of a video game. Further, the hardware processor may be further configured to communicate with the electronic data store. The electronic data store may be further configured to store game participant data structures storing information about users requesting to play the video game. Moreover, the hardware processor may be further configured to identify a plurality of users to play the instance of the video game. Each user of the plurality of users may be associated with a different user computing system of a plurality of user computing systems. For each user of the plurality of users, the hardware processor may be further configured to access, from the electronic data store, a connection statistics data packet storing network connection statistics for the user computing system associated with the user. The network connection statistics may correspond to at least one test communication performed with each data center of a plurality of data centers and the user computing system. Moreover, the hardware processor may be further configured to execute a first rules engine to generate a score for each data center of the plurality of data centers. Each score may be based at least in part on an assessment of the network connection statistics associated with each user of the plurality of users and the data center. In addition, the hardware processor may be further configured to execute a second rules engine to determine a selected data center from the plurality of data centers based at least in part on the score generated for each data center of the plurality of data centers. The hardware processor may be further configured to generate a data center selection packet storing the selected data center. The data center selection packet may be configured for transmission to at least one user computing system of the plurality of user computing systems. Moreover, the hardware processor may be further configured to transmit the data center selection packet to a network interface for transmission to the at least one user computing system.

Certain embodiments disclosed herein relate to a non-transitory computer-readable storage medium storing computer executable instructions for assessing network connections that, when executed by one or more computing devices, configure the one or more computing devices to perform operations comprising communicating over a network with a first user computing system associated with a first user. Further, the operations may include receiving, from the first user computing system, a trigger instruction data packet comprising an electronic indication indicating a request by the first user to play an instance of a video game.

Additionally, the operations may include communicating with a physical data store. The physical data store may be configured to store game participant data structures storing information about users requesting to play the video game. In addition, the operations may include identifying a plurality of users to play the instance of the video game. Each user of the plurality of users may be associated with a different user computing system of a plurality of user computing systems. For each user of the plurality of users, the operations may include accessing, from the physical data store, a connection statistics data packet storing network connection statistics for the user computing system associated with the user. The network connection statistics may correspond to at least one test communication performed with each data center of a plurality of data centers and the user computing system. Further, the operations may include executing a first rules engine to generate a score for each data center of the plurality of data centers. Each score may be based at least in part on an assessment of the network connection statistics associated with each user of the plurality of users and the data center. Moreover, the operations may include executing a second rules engine to determine a selected data center from the plurality of data centers based at least in part on the score generated for each data center of the plurality of data centers. Further, the operations may include generating a data center selection packet storing the selected data center. The data center selection packet may be configured for transmission to at least one user computing system of the plurality of user computing systems. Moreover, the operations may include transmitting the data center selection packet to a network interface for transmission to the at least one user computing system.

Certain embodiments of the present disclosure relate to a computer-implemented method implemented by an interactive computing system configured with specific computer-executable instructions. The method may include receiving a trigger to play an instance of a video game and identifying a plurality of users to play the instance of the video game. The plurality of users may be associated with a plurality of user computing systems. Further, each user of the plurality of users may be associated with a different user computing system of the plurality of user computing systems. For each user of the plurality of users, the method may further include accessing connection statistics for the user computing system associated with the user. The connection statistics may correspond to a test communication performed with each data center of a plurality of data centers. Moreover, the method may include generating a score for each data center of the plurality of data centers based at least in part on an aggregation of the connection statistics for the user computing system of each user. Additionally, the method may include selecting a data center from the plurality of data centers based at least in part on the score generated for each data center of the plurality of data centers and providing an identity of the selected data center to at least one user computing system of the plurality of user computing systems.

In certain embodiments, the score for each data center is based at least in part on a mean value of a round trip time of a test packet between each of the user computing systems of the plurality of user computing systems and the data center. Alternatively, or in addition, the score for each data center may be based at least in part on a variance of a round trip time of a test packet between each of the user computing systems of the plurality of user computing systems and the data center. Further, generating the score for each data center of the plurality of data centers may comprise generating the score for a particular server at each data center.

In some implementations, the method further includes selecting the plurality of data centers from a set of data centers based at least in part on a geographic location of at least one user computing system of the plurality of user computing systems. In some cases, selecting the data center comprises selecting the particular server at the data center. Alternatively, or in addition, selecting the data center from the plurality of data centers may include identifying a first data center associated with a lowest score, identifying a second data center associated with a second lowest score, and determining whether the second lowest score is within a threshold difference of the lowest score. In response to the second lowest score being within the threshold difference of the lowest score, the method may include performing a secondary selection process to select one of the first data center or the second data center. The secondary selection process may include determining whether a first average number of network hops between the plurality of user computing systems and the first data center or a second average number of network hops between the plurality of user computing systems and the second data center is lower.

The method may further include receiving an identity of a user computing system of the plurality of user computing systems and providing the user computing system with a network address for each of the plurality of data centers. Further, the method may include causing the user computing system to perform the test communication with each data center of the plurality of data centers. In response to detecting a trigger condition, the method may include causing the user computing system to repeat the test communication with each data center of the plurality of data centers. Further, in some cases, the method may include initiating the instance of the video game with the plurality of users at the selected data center.

Some embodiments of the present disclosure relate to a system that includes an electronic data store configured to store connection statistics for communication between a plurality of user computing systems and a plurality of data centers. Further, the system may include a hardware processor in communication with the electronic data store. The hardware processor may be configured to execute specific computer-executable instructions to at least receive a trigger to play an instance of a video game and identify a plurality of users to play the instance of the video game. The plurality of users may be associated with the plurality of user computing systems and each user of the plurality of users may be associated with a different user computing system of the plurality of user computing systems. For each user of the plurality of users, the hardware processor may be further configured to access connection statistics from the electronic data store for the user computing system associated with the user. The connection statistics may correspond to a test communication performed with each data center of a plurality of data centers. In addition, the hardware processor may be further configured to generate a score for each data center of the plurality of data centers based at least in part on the connection statistics for the user computing system of each user and to select a data center from the plurality of data centers based at least in part on the score generated for each data center of the plurality of data centers. In some cases, the hardware processor may be further configured to provide an identity of the selected data center to at least one user computing system of the plurality of user computing systems.

In certain embodiments, generating the score for each data center of the plurality of data centers comprises generating the score for a particular server at each data center. Further, selecting the data center may comprise selecting the particular server at the data center. Further, selecting the data center of the plurality of data centers may comprise identifying a first data center associated with a lowest score, identifying a second data center associated with a second lowest score, and determining whether the second lowest score is within a threshold difference of the lowest score. In response to the second lowest score being within the threshold difference of the lowest score, the hardware processor may be further configured to perform a secondary selection process to select one of the first data center or the second data center. Moreover, the secondary selection process may comprise determining whether a first average number of network hops between the plurality of user computing systems and the first data center or a second average number of network hops between the plurality of user computing systems and the second data center is lower.

With some implementations, the hardware processor is further configured to execute specific computer-executable instructions to at least receive an identity of a user computing system of the plurality of user computing systems and provide the user computing system with a network address for each of the plurality of data centers. Further, the hardware processor may be further configured to cause the user computing system to perform the test communication with each data center of the plurality of data centers. Moreover, the hardware processor may be further configured to execute specific computer-executable instructions to at least receive from the user computing system a result of the test communication with each data center of the plurality of data centers and store the result at the electronic data store. In some cases, the hardware processor is further configured to execute specific computer-executable instructions to at least detect a trigger condition and, in response to detecting the trigger condition, cause the user computing system to repeat the test communication with each data center of the plurality of data centers.

Certain embodiments of the present disclosure relate to a non-transitory computer-readable storage medium storing computer executable instructions that, when executed by one or more computing devices, configure the one or more computing devices to perform operations comprising receiving a trigger to play an instance of a video game and identifying a plurality of users to play the instance of the video game. The plurality of users may be associated with a plurality of user computing systems and each user of the plurality of users may be associated with a different user computing system of the plurality of user computing systems. For each user of the plurality of users, the operations may further include accessing connection statistics for the user computing system associated with the user. The connection statistics may correspond to a test communication performed with each data center of a plurality of data centers. Further, the operations may include generating a score for each data center of the plurality of data centers based at least in part on the connection statistics for the user computing system of each user. In addition, the operations may include selecting a data center from the plurality of data centers based at least in part on the score generated for each data center of the plurality of data centers and providing an identity of the selected data center to at least one user computing system of the plurality of user computing systems.

In some embodiments, selecting the data center from the plurality of data centers comprises selecting the data center from a subset of the plurality of data centers. The score of each data center of the subset of the plurality of data centers may be within a threshold difference from a lowest score. Further, the operations may include receiving an identity of a user computing system of the plurality of user computing systems, providing the user computing system with a network address for each of the plurality of data centers, and causing the user computing system to perform the test communication with each data center of the plurality of data centers.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
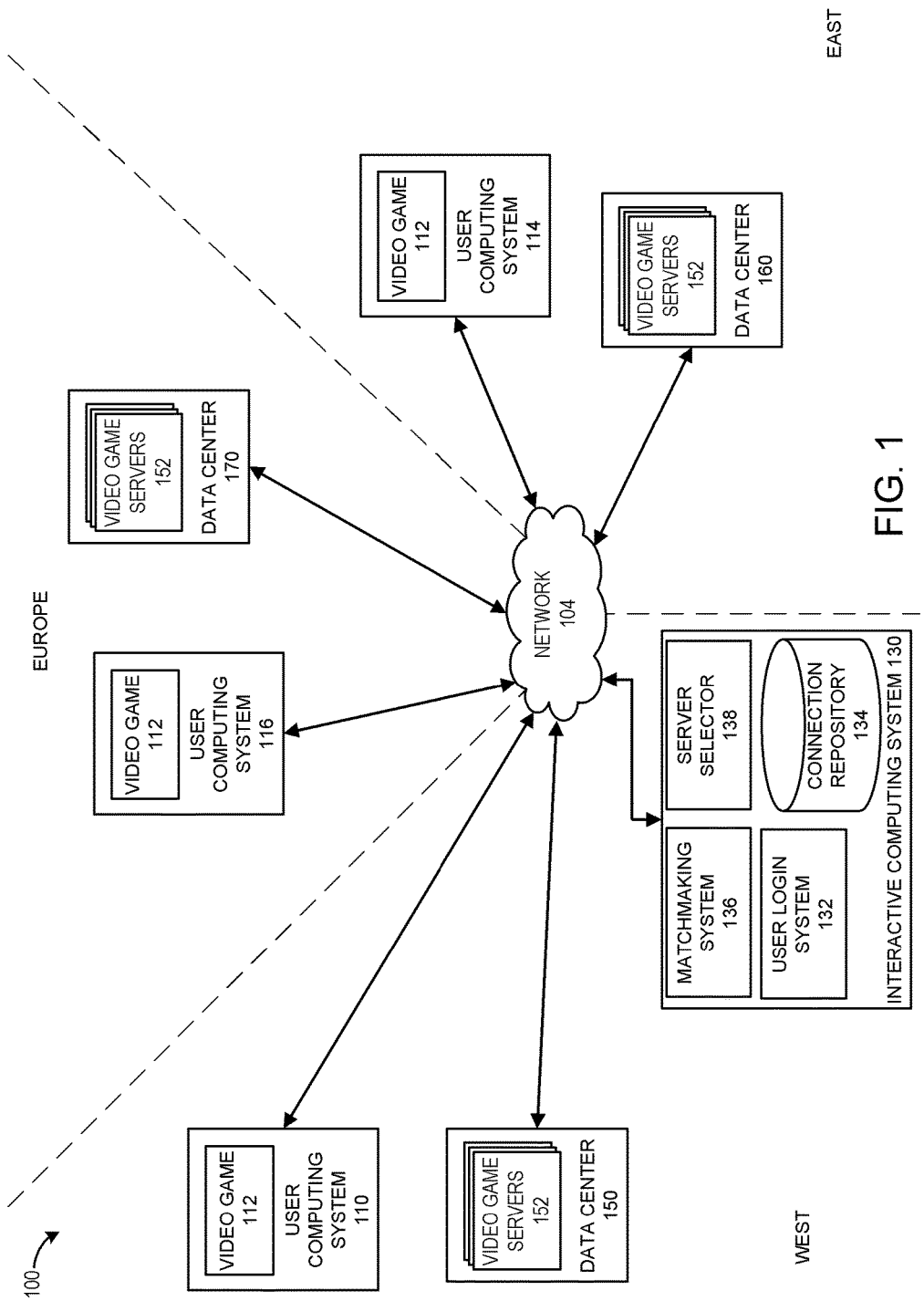
FIG. 1 illustrates an embodiment of a networked computing environment that can implement one or more embodiments of an application server selection system.

Multiplayer video games have become more important to the video game industry. To maintain player retention, it is important for users to have a positive experience when playing multiplayer video games. One factor in maintaining a positive experience for users is to provide a multiplayer experience that is not negatively affected by the quality of communication connections among the users. For multiplayer video games that use a server to manage communication among the computing devices of the users, maintaining a positive experience for the users may include providing a network connection to the server hosting the video game that has a relatively low latency and/or low occurrence of packet drops.

One method for providing an improved multiplayer experience is to select a data center or server to host the video game that is relatively near to a location of the user compared to other available data centers or servers. However, when playing multiplayer video games, selecting a data center or server that is relatively near to a location of one user from the group of users wanting to play an instance of a multiplayer video game may mean selecting a data center or server that is relatively far from a location of another user from the group of users wanting to play the instance of the multiplayer video game compared to other available data centers or servers.

One attempt to resolve the above problem involves selecting a data center server based on the location of a particular user, such as the first user in a group of users or a random user in a group of users who have requested or have been selected to play an instance of the video game together. Another attempt to resolve the above problem involves selecting a data center or server that is relatively near to a location of a designated user and to rotate which user from the group of users is the designated user after each match. However, in some cases, both of the above methods may still result in some users having a negative multiplayer experience.

Embodiments presented herein include a system and method for selecting an application host system (for example, a server at a data center) to host an instance of a multiplayer video game session that assesses a quality of a connection to the application host system for each of the users who request or are selected to play within the multiplayer video game session. In some cases, systems and methods presented herein may obtain connection statistics information from the user computing device of each user that has joined an instance of a multiplayer game session or desires to play together within an instance of the multiplayer game session. This connection statistics information can be associated with a connection to a plurality of potential servers or data centers that may host the multiplayer video game session. Using the connection statistics information, systems and methods presented herein can derive a score for each potential server or data center. A server or data center can then be selected based on the derived scores from the plurality of potential servers for data centers that is likely to provide the best connection experience for the group of users that are to participate in the multiplayer video game session. In some cases, the best connection experience may be determined based at least in part on a connection that has the lowest latency, the fastest connection, the lowest rate of packet drops, or any other characteristic that can be used to quantify a quality of a connection from the user computing devices to the server or data center hosting the video game. In certain embodiments, the selected server or data center may not provide the best network connection for an individual user from the group of users, but may provide the best network connection on average for the group of users.

To simplify discussion, the present disclosure is primarily described with respect to a video game. However, the present disclosure is not so limited, as such, the present disclosure may be applied to other types of applications. For example, embodiments disclosed herein may be applied to educational applications, video conferencing, or other applications that may connect a plurality of users over a network.

Example Networked Computing Environment

FIG. 1 illustrates an embodiment of a network computing environment 100 that can implement one or more embodiments of an application server selection system. This application server selection system may be implemented within or as part of the interactive computing system 130.

The network computing environment 100 can include a number of user computing systems. For example, the network computing environment 100 includes a user computing system 110, a user computing system 114, and a user computing system 116. Although only three user computing systems are illustrated, it should be understood that the network computing environment 100 can include any number of user computing systems. Each of the user computing systems 110, 114, 116 may be configured to execute a video game 112, or at least a portion of the video game 112. This video game 112 may be a multiplayer video game that can be played with multiple users via a server, such as one of the video game servers 152.

The user computing systems 110, 114, 116 may be distributed around different parts of the world. The dashed lines within FIG. 1 illustrate a conceptual division of portions of the world. It should be understood that these divisions are only one example and the distribution of systems may differ in certain embodiments. In the particular example illustrated in FIG. 1, the user computing system 110 is located in the Western United States (as represented by the label WEST), the user computing system 114 is located in the Eastern United States (as represented by the label EAST), and the user computing system 116 is located in Europe (as represented by the label EUROPE). Further, although a single user computing system is located within each of the geographical regions illustrated in FIG. 1, it should be understood that any number of user computing systems may be located within each geographical region and a variety of geographical regions may be included.

The video game servers 152 may be hosted or included in one or more data centers, such as the data centers 150, 160, 170. The data centers 150, 160, 170 are typically physical locations that may include a number of computing resources that may be accessed by a plurality of users. For example, the data centers 150, 160, 170 may include one or more host systems, such as the video game servers 152, for hosting at least a portion of copies of the video game 112. In certain embodiments, the data centers 150, 160, 170 may include additional computing systems that facilitate management of the video game servers 152. For example, the data centers 150, 160, 170 may include systems for load balancing the video game servers 152 or systems for facilitating network connections with the video game servers 152, such as one or more routers, hubs, or switches.

As illustrated by the stacked boxes associated with the video game servers 152, each of the data centers 150, 160, 170 may include multiple video game servers 152. In some cases, different video game servers 152 may be configured to host different video games. Further, in certain embodiments, a data center may host a single video game server.

As with the user computing systems 110, 114, 116, the data centers 150, 160, 170, or the video game servers 152 therein, may be distributed throughout the world. In the particular example illustrated in FIG. 1, the data center 150 is located in the Western United States, the data center 160 is located in the Eastern United States, and the data center 170 is located in Europe. Further, although a single data center is located within each of the geopolitical regions illustrated in FIG. 1, it should be understood that any number of data centers may be located within each geopolitical region and a variety of geopolitical regions may be included.

The interactive computing system 130, in the example illustrated in FIG. 1, is located within the Eastern United States. However, it should be understood that the interactive computing system 130 may be located in any region of the world. Further, while a number of different data centers and/or video game servers may be distributed throughout the world for supporting multiplayer sessions of the video game 112, a single interactive computing system 130 may support the video game 112. However, this interactive computing system 130 may be distributed among a number of computing systems. Further, in certain embodiments, multiple interactive computing systems 130 may exist for supporting the video game 112. In some such embodiments, users accessing one interactive computing system 130 may not be capable of playing a session of video game 112 with users who are accessing another interactive computing system. In other embodiments, users may be able to play a single session of the video game 112 regardless of the interactive computing system 130 accessed by the user computing systems associated with the users.

The interactive computing system 130 may include a number of systems implemented in hardware and/or software to facilitate connecting user computing systems of one or more users to a particular data center and/or video game server to enable a multiplayer gaming session of the video game 112. For example, the interactive computing system 130 may include a user login system 132, a connection repository 134, a matchmaking system 136, and/or a server selector 138.

The user login system 132 may include any system that can facilitate obtaining user login information and confirming a user's account information. The user login information may include any information that can be used to identify the user, such as a username, a password, an avatar name, and so forth. In some cases, the user login information may include a unique token or hardware identifying information, such as a media access control (MAC) address or other unique identifier for hardware that is included in the user computing system 110. Further, the user login information may, in some cases, also identify the video game 112 that the user desires to play. In certain embodiments, the user login system 132 may provide a user computing system with the identity of one or more data centers that include servers that support or host the video game 112. In some cases, providing the identity of the one or more data centers may include providing a networking address, such as an Internet protocol (IP) address for each of the data centers. Providing the networking address for each of the data centers may include providing a network address for a management system at each of the data centers and/or a network address for a video game server at each of the data centers. Moreover, in some cases, the user login system 132 can trigger the user computing system associated with the user who provided the login information to perform one or more network connection tests with the identified data centers.

The results of the network connection tests may be provided to the user login system 132. The user login system 132 may store the results of the network connection test set a connection repository 134. Further, the results of the network connection tests may be associated with the user login information and/or the user computing system associated with the user at the connection repository 134.

The matchmaking system 136 can match a user with one or more other users that desire to play an instance of the video game 112. The users may be matched as teammates, opponents, or a combination of teammates and opponents. The matchmaking system 136 may access a queue of users that have indicated a desire to play the video game 112. Further, the matchmaking system 136 may use one or more selection algorithms to select a plurality of users to play an instance of the video game 112. In some embodiments, the matchmaking system 136 may account for the desire of two or more users to play together as opponents or teammates in an instance of the video game 112. In some embodiments, the matchmaking system 136 may implement one or more of the algorithms for matching potential players of an instance of a video game disclosed in U.S. application Ser. No. 15/064,115, which was filed on Mar. 8, 2016 and is titled "MULTIPLAYER VIDEO GAME MATCHMAKING OPTIMIZATION," and which is incorporated by reference in its entirety herein and for all purposes. Further, in some embodiments, the matchmaking system 136 may implement one or more of the algorithms for matching potential players of an instance of a video game disclosed in U.S. application Ser. No. 14/714,021, which was filed on May 15, 2015 and is titled "SYSTEMS AND METHODS FOR HARDWARE-BASED MATCHMAKING," and which is incorporated by reference in its entirety herein and for all purposes.

The server selector 138 can include any system that can select a data center 150, 160, 170 and/or a server at a data center 150, 160, 170 to host an instance of the video game 112 for a set of players or users to play together. The server selector 138 may select the data center and/or server based at least in part on the connection information obtained by the user login system 132 and/or stored at the connection repository 134.

The user computing systems 110, 114, 116 may include hardware and software components for establishing communications over a communication network 104 communicate with the data centers 150, 160, 170, or video game servers 152 hosted therein. For example, the user computing systems 110, 114, 116 may be equipped with networking equipment and network software applications (for example, a web browser) that facilitate communications via a network (for example, the Internet or an intranet). The user computing systems 110, 114, 116 may have varied local computing resources, such as central processing units and architectures, memory, mass storage, graphics processing units, communication network availability and bandwidth, and so forth. Further, the user computing systems 110, 114, 116 may include any type of computing system. For example, the user computing systems 110, 114, 116 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing systems 110, 114, 116 may include one or more of the embodiments described below with respect to FIG. 4 and FIG. 5.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet. The network 104 can be a collection of networks, which may include, for example, a plurality of wired and wireless networks, asynchronous transfer mode (ATM) networks, or cellular networks, and the like. Moreover, the underlying communication protocol used by the network 104 may vary. For example, the underlying communication protocol can include the transmission control protocol (TCP), the user datagram protocol (UDP), or any other communication protocol that may be used to communicate data between two or more computing devices.

Example Connection Measurement Process

Figure 2:
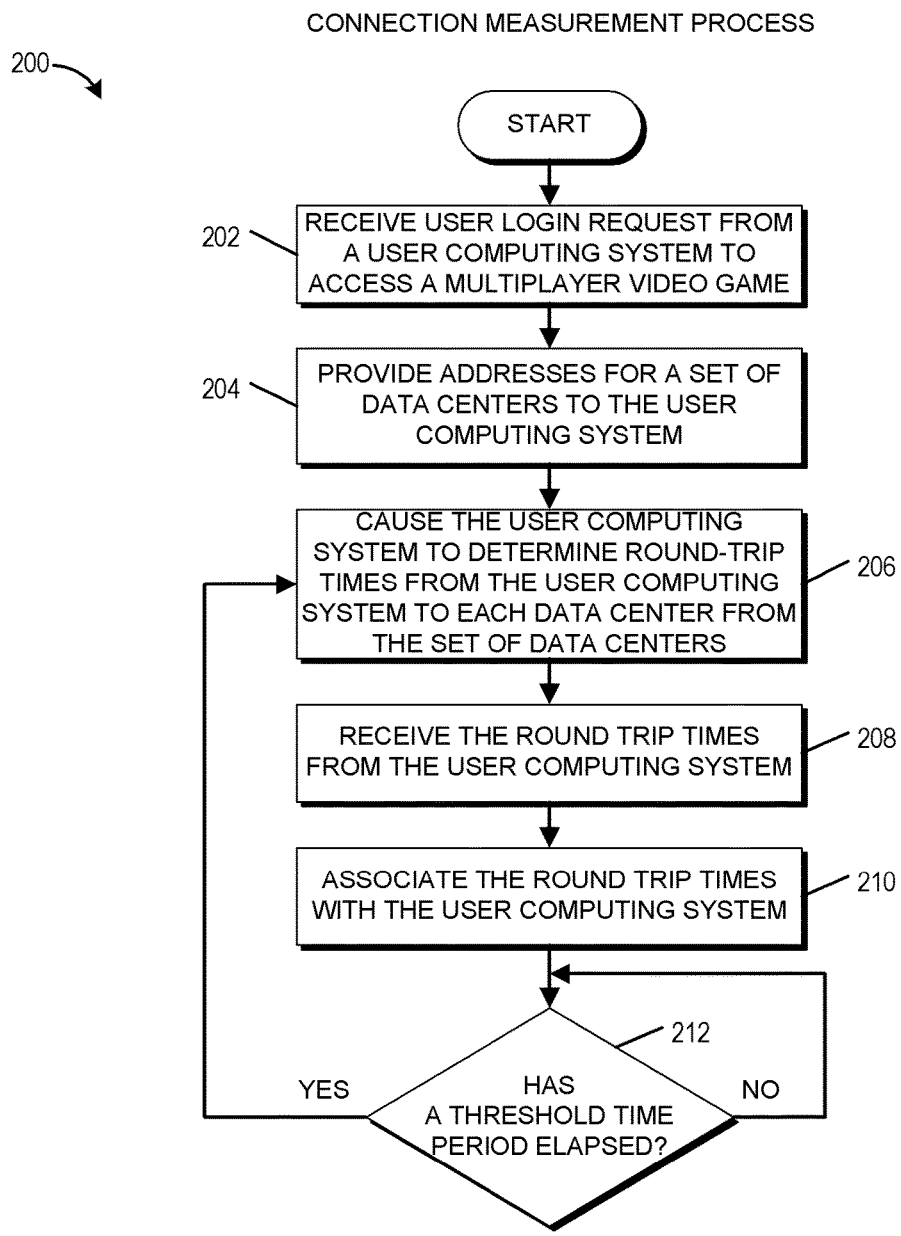
FIG. 2 presents a flowchart of an embodiment of a connection measurement process.

FIG. 2 presents a flowchart of an embodiment of a connection measurement process 200. The process 200 can be implemented by any system that can obtain a measurement of connection quality between a user computing system and a number of servers configured to host an instance of a multiplayer video game. The process 200, in whole or in part, can be implemented by, for example, an interactive computing system 130, a user login system 132, a connection repository 134, a matchmaking system 136, a server selector 138, or a user computing system 110, 114, 116, among others. Although any number of systems, in whole or in part, can implement the process 200, to simplify discussion, the process 200 will be described with respect to particular systems.

The process 200 begins at block 202 where the user login system 132 receives a user login request from a user computing system 110 to access a multiplayer video game 112. Typically, the video game 112 is a client/server based video game. In other words, users may play the video game 112 together by accessing a server, which hosts at least a portion video game 112. The users may access the server via their respective user computing systems. In some cases, a portion of the video game 112 may be executed from the user computing systems. In other cases, an entire instance of the video game 112 is executed at a server 152.

At block 204, the user login system 132 provides addresses for a set of data centers 150, 160, 170 to the user computing system 110. Providing the addresses for a set of data centers may include providing addresses for a particular system at each of the data centers. For example, the user login system 132 may provide an address of a management system at each of the set of data centers. As a second example, user login system 132 may provide an address of a particular server at each of the set of data centers. Providing an address for the set of data centers and/or servers may include providing an Internet protocol (IP) address for each of the set of data centers and/or servers. Alternatively, or in addition, providing the address may include providing other identifying information that enables a user computing system 110 to establish a communication connection over the network 104 with a data center and/or server.

In some cases, the user login system 132 provides addresses for all of the data centers and/or servers that support or are capable of hosting the video game 112. In other cases, the user login system 132 may provide addresses for a subset of the data centers and or servers that support or are capable of hosting the video game 112. For example, the user login system 132 may identify a geographic location of the user computing system and may filter or select a subset of available data centers based at least in part on the geographic location of the user computing system. The video game 112 may be identified as part of the login process at the block 202 or as part of a separate operation that may be performed during her prior to the block 204.

In certain embodiments, the block 204 may be optional or omitted. For example, in some cases, the identity of the data centers and/or servers that support and/or host the video game 112 may be pre-coded into a game client of the video game 112. However, typically, the data centers and/or servers will not be pre-coded into the game client as it is likely that the addresses of the available data centers and/or servers may change over time.

At block 206, the user login system 132 causes the user computing system 110 to determine round-trip times from the user computing system 110 to each data center, or server therein. The round-trip times may be determined using a test packet that is sent to the data center. The amount of time between the transmission of the test packet and a receipt of an acknowledgment may be used to determine the round-trip time from a user computing system 110 to a particular data center. Alternatively, or in addition, the round-trip times may be determined using one or more network test tools. For example, the user computing system 110 can ping each of the data centers using the ping tool. Alternatively, or in addition, one or more other network characteristics may be determined at the block 206. These alternative or additional network characteristics may relate to connection statistics between the user computing system 110 each data center 150, 160, 170. Further, these connection statistics may include packet loss information, geographic distance, network distance (for example, a number of hops between the user computing system and each of the data centers), available bandwidth, connection speed, and the like. Further, one or more network tools may be used to determine packet loss, throughput, latency, and the like between the user computing system 110 and each of the data centers 150, 160, 170. Moreover, in some cases, the user computing system 110 may determine a number of network hops, or portions of a network path, between the user computing system 110 and each of the data centers 150, 160, 170.

In certain embodiments, the block 206 may include causing the user computing system to perform multiple determinations of the round-trip times and/or other network characteristics to each of the data centers 150, 160, 170. Further, in some cases, the multiple determinations may be averaged and/or aggregated using some other aggregation method. Alternatively, or in addition, the best or worst round-trip time or network characteristics may be provided for each of the data centers.

In some embodiments, the performance of the block 206 may occur automatically in response to receiving the addresses for the set of data centers at the block 204. Alternatively, or in addition, a portion of the video game 112 at the user computing system 110, rather than the user login system 132, may trigger the determination of the round-trip times, or other network characteristics, upon receipt of the addresses for the data centers. Thus, in some such embodiments, the block 206 may be optional or omitted.

At block 208, the user login system 132 receives the round-trip times from the user computing system 110. As stated above, receiving the round-trip times may include receiving an average of multiple determinations of the round-trip times. Alternatively, receiving round-trip times may include receiving a best and/or worst determined round-trip time to each of the data centers.

At block 210, the user login system associates the round-trip times with the user computing system 110 and/or a user associated with the user computing system 110. In some cases, the raw network characteristics (for example, the round-trip times) are associated with the user computing system 110. Alternatively, or in addition, a score is calculated based on the round-trip times, or other network characteristic information, and the score is associated with the user computing system 110 for each of the data centers. Furthermore, the block 210 may include storing the round-trip times and/or the association of the round-trip times with the user computing system 110 and/or the user at the connection repository 134. Although in other embodiments, the score is generated by a data centers selection process.

At decision block 212, the interactive computing system 130 determines whether a threshold time period has elapsed. If the threshold time period has not elapsed, the process 200 returns to the decision block 212. Operations associated with the decision block 212 may be repeated until the threshold time period has elapsed or the user computing system 110 ceases to execute the video came 112.

If it is determined at the decision block 212 that the threshold time period has elapsed, the process 200 returns to the block 206 where the user login system 132 repeats the process of causing the user computing system 110 to determine round-trip times from user computing system 110 to each data center from the set of data centers 150, 160, 170. This loop allows a new data center/server to be assigned if the previously selected data center's/server's round-trip time are no longer the best (for example, the lowest) for a set of users selected or who have chosen to play an instance of a video game together. In other embodiments, the process 200 does not loop back to the block 206 at the end of a threshold time period. Instead, the process 200 may be performed only when triggered by, for example, a user logging into a server or a user being selected to play an instance of the video game.

Alternatively, or in addition, to determining whether a threshold time period has elapsed, the decision block 212 may determine whether communication between a user computing system 110 and a selected data center, or selected server, was slower than anticipated or did not satisfy an expected criterion for the communication. The determination that the communication between the user computing system 110 and the selected data center, or server, does not satisfy the expected criterion may be determined and/or reported by the user computing system 110 and/or the data center or server.

In some embodiments, the decision block 212 may include determining whether a change in the time of day has occurred. For example, the threshold time period may be shorter in the evening when more people may be at home playing video games than during the day when less people may be playing video games due to, for example, work or school responsibilities. Furthermore, in some cases, portions of the process 200 may be repeated in response to a determination that there is a change in the availability of a data center or server.

In some embodiments, if the threshold time period has elapsed, control over communication with the user computing system 110 may be returned to the interactive computing system 130 from a data center and/or server at which the user was playing the video game 112. Alternatively, or in addition, communication with the user computing system 110 may automatically be returned to the interactive computing system 130 after the completion of each round or play session of the video game 112. This may occur because, for example, the matchmaking system 136 is used to organize the next round or play session of the video game 112. Thus, operations associated with the decision block 212 may be performed subsequent to communication with the user computing system 110 being returned to the interactive computing system 130. In other words, in some cases, if the threshold time period elapses while a user is playing an instance of the video game 112, the process 200 may wait until the particular gaming session is completed before returning to the block 206. Once the particular gaming session is completed, the user computing system 110 may reestablish communication with the matchmaking system 136 to repeat the process of configuring a new gaming session. Further, once a particular gaming session is completed, the process 200 may then proceed from the decision block 212 to the block 206 to determine updated round-trip times from the user computing system 110 to each of the data centers.

In certain embodiments, one of the user computing systems 110, 114, 116 may function as the server for the client/server based video game 112. In such cases, one of the user computing systems 110, 114, 116 may function as both a client and a server. For example, the user computing system 110 may function as a client for a user associated with the user computing system 110 and may function as a server for the other user computing systems 114, 116. In certain embodiments, the processes disclosed herein, including the process 200 and the process 300 described below, may be used to select the user computing system that will function as the server. In some cases, the process 200 may include identifying a set of users to play an instance of the videogame 112 together. The process 200 may further include determining round-trip times, or other network characteristic information, between each of the user computing systems of the set of users. The user computing system that will function as the server for the set of users may be selected based at least in part on the round-trip times and/or other network characteristic information.

Example Data Center Selection Process

Figure 3:
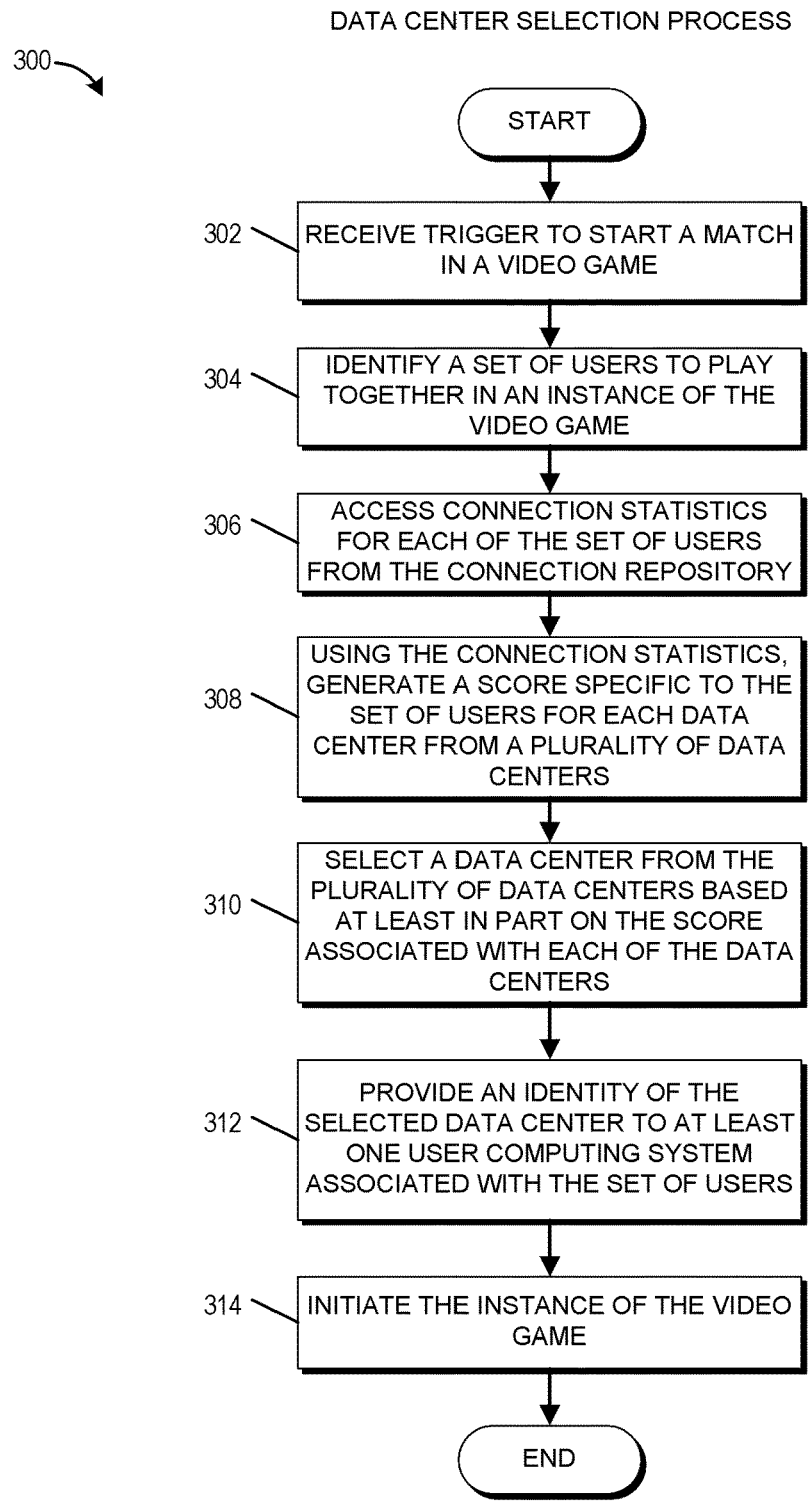
FIG. 3 presents a flowchart of an embodiment of a data center selection process.

FIG. 3 presents a flowchart of an embodiment of a data center selection process 300. The process 300 can be implemented by any system that can select a data center and/or a server to host a multiplayer session of an instance of a video game 112 for a set of users. The process 300, in whole or in part, can be implemented by, for example, an interactive computing system 130, a user login system 132, a connection repository 134, a matchmaking system 136, a server selector 138, or a user computing system 110, 114, 116, among others. Although any number of systems, in whole or in part, can implement the process 300, to simplify discussion, the process 300 will be described with respect to particular systems. Further, although the process 300 is described with respect to selecting a data center, it should be understood that the process 300 may also be used for the selection of a server that may host at least a portion of the video game 112.

The process 300 begins at block 302 where interactive computing system 130 receives a trigger to start a match in a video game 112. The trigger may be a selection of a user interface element indicating a request to start the match in the video game 112 or to matchup a user with a set of users to initiate a multiplayer session of the video game 112. In some cases, the interactive computing system 130 receives a trigger to join an existing instance of a video game 112 with a set of users. For example, a video game 112 may include a persistent world that enables a user or a set of users to join or leave an instance of the video game 112 as desired.

At block 304, the matchmaking system 136 identifies a set of users to play together in an instance of the video game. The set of users may be selected to play together as teammates, opponents, or a combination of the two.

At block 306, the server selector 138 accesses connection statistics for each user of the set of users from the connection repository 134. Accessing connection statistics for a user may include accessing connection statistics for a user computing system associated with the user. These connection statistics may include any type of information associated with a communication connection or potential truncation connection between the user computing system of the user and a set of available data centers. For example, the connection statistics may include round-trip times between the user computing system and each of the set of data centers, latency information for each potential connection, packet loss information, a geographic distance, a network distance (for example, a number of hops between the user computing system and each of the data centers), bandwidth available within the potential communication connections, a speed of the potential connections, and the like. In some embodiments, the connection statistics may be collected using the connection measurement process described with respect to FIG. 2.

At block 308, using the connection statistics accessed at the block 306, the server selector 138 generates a score specific to the set of users identified at the block 304 for each data center from a plurality of data centers. The score specific to the set of users may include an aggregation of connection statistics for the set of users for each of the data centers from the plurality of data centers. This aggregation of connection statistics may depend on the type of connection statistics accessed at the block 308. In some cases, the score may be generated using one or more statistical algorithms to combine or otherwise analyze the connection statistics associated with each of the data centers for the set of users. For example, the score may be, or may be based on, an average or mean of round-trip times between each user's user computing system and a particular data center. As another example, the score may be based on a variance or a standard deviation of the round-trip times between each user's user computing system and a particular data center. In some embodiments, the score may comprise a set of scores. For example, the mean, variance, and the standard deviation may all be calculated for connection to the particular data center by the user computing system of the set of users. Some or all of the independent calculated values may be used as part of the process 300 to select a data center. In some cases, the plurality of data centers may be a subset of available data centers selected based at least in part on the video game 112. For example, in some cases, only a subset of data centers may host particular video games. In such cases, the set of data centers may be filtered based on the selected video game 112. In some embodiments, the block 308 may include accessing a rules database that includes one or more rules for generating the score based at least in part on the users, the video game, the data centers, and the like.

At block 310, the server selector 138 selects a data center from the plurality of data centers based at least in part on the score associated with each of the data centers. The sever selector 138 may select the data center corresponding to the "best" score (for example, a highest score or a lowest score depending on the type of score generated) or that has a score that satisfies a threshold. In some cases, the block 310 may include using a tie-breaking process if two or more data centers have the same score or the difference in scores between two or more data centers is less than a threshold difference. The tie-breaking process may include using additional scores or communication statistics to select the data center. For example, if the average round trip time of a test packet between user computing systems for a set of users and two different data centers are the same or less than a threshold difference, the variance in the round-trip time may be used as a tie-breaking factor. As another example of tie-breaking factor, the average number of hops between the user computing systems and the data centers may be used to select one of the data centers.

In some embodiments, the block 310 may include selecting a server at a particular data center. For example, once a particular data center is selected, a server may be selected from a set of servers at the data center based at least in part on the available resources of the server, the number of users on the server, the uptime of the server, or any other factor that may be used to select a server at a data center.

At block 312, the server selector 138 provides an identity of the selected data center to at least one user computing system associated with a user from the set of users. Providing the identity of the selected data center may include providing an IP address of the data center, or a particular server within the data center. Alternatively, or in addition, providing the identity of the selected data center may include providing any other type of information that may be used by a user computing system to establish a connection with the data center or server therein.

Typically, the server selector 138 may provide the identity of the selected data center to the user computing system of each user from the set of users. However, in some cases, the server selector 138 may provide the identity of the selected data center to a user computing system of a single user. For example, the identity of the selected data center may be provided to a user computing system of the user identified as a leader, or first user, from the set of users. In some such cases, the user computing system of the leader may distribute the identity of the selected data center to the user computing systems of the other users from the set of users.

At block 314, the instance of the video game 112 is initiated. The instance of the video game 112 may be initiated by the matchmaking system 136, the server selector 138, or the interactive computing system 130. Alternatively, once each of the user computing systems of the set of users has the identity of the selected data center, the users may establish a communication connection with the selected data center or server at the selected data center and the instance of the video game may be initiated by one of the user computing systems and/or by the selected data center or selected server therein.

However, in some cases, one or more users may disconnect from the interactive computing system 130 or elect not to play the video game 112 with the set of users identified at the block 304. In some such cases, at least a part of the process 300 may be repeated. For example, if one or more users from the set of users elect not to play the video game 112 with a set of users before an instance of the video game 112 is initiated, the process 300 may return to the block 304 where a new set of users may be identified. Typically, identifying a new set of users may include identifying one or more users to replace the one or more users who elected not to play the video game 112. The newly identified one or more users may be joined with any remaining users from the initial set of users. In some cases, the new set of users may result in a different data center been selected at the block 310.

Example Use Case

In one non-limiting example use case, suppose that five users desire to play the video game 112 and have been selected to play together. After each of these users have logged in to an interactive computing system 130, the user computing system for each of the users may be provided with the IP address of the data centers 150, 160, 170 of FIG. 1. The user computing systems for each of the five users may perform a ping operation to determine the round-trip time for a communication with each of the data centers 150, 160, 170, or a server therein. This ping operation may be performed as part of the occurrence of the process 200. It should be understood that each of the five users may login or establish a connection to the interactive computing system 130 at different time periods. However, in this particular use case, all five of the users are connected to the interactive computing system 130 at least partially at the same time. Further, each of the five users are selected to play the same instance of the video game 112. One example of the results from the ping operations is illustrated below in Table 1.

TABLE 1

| User Name | Data Center 150 (ping-ms) | Data Center 160 (ping-ms) | Data Center 170 (ping-ms) |
| --- | --- | --- | --- |
| Karen | 170 | 111 | 63 |
| William | 110 | 76 | 143 |
| Phillip | 80 | 50 | 109 |

TABLE 1-continued

| User Name | Data Center 150 (ping-ms) | Data Center 160 (ping-ms) | Data Center 170 (ping-ms) |
|---|---|---|---|
| Tracy | 32 | 89 | 180 |
| Terrance | 102 | 34 | 108 |
| Mean | 100 | 72 | 121 |
| Variance | 2121 | 751 | 1528 |
| Std. Dev. | 46 | 27 | 39 |

The results of the ping operation may indicate in milliseconds the amount of time it takes to contact a data center or server at the data center and receive an acknowledgment. In addition to the ping times, Table 1 also includes the mean, the variance, and the standard deviation for the ping times to each of the three data centers. The determination of the mean, the variance, or the standard deviation may occur as part of the process 300.

In some cases, as part of the process 300, a data center may be selected for the five users to play the instance of video game 112. Using, for example, the mean of the ping values as the score previously described with respect to the process 300, the data center 160 may be selected to host the instance of the video game 112 to be played by the five users identified in Table 1 because, for example, the mean value of the connection times to the data center 160 is lowest of the three available data centers.

Analyzing the values in Table 1, it can be seen that the selection of data center 160 is not necessarily optimal for each of the five users. For example, a connection to the data center 170 may provide a better communication connection for Karen as indicated by the lower ping value compared to the data centers 150 and 160 for Karen. Similarly, the data center 150 may be preferable for Tracy compared to the data centers 160 and 170. However, collectively, the data center 160 is preferable for the group as a whole compared to the data centers 150 and 170 based on the average ping times for the five users.

In some embodiments, the ping times (or other network connection statistic or score value) may be weighted differently for some of the users. For example, a user associated with a higher expected churn rate, or lower expected retention rate, may have a ping time or other score characteristic weighted more heavily than a user with a lower expected churn rate, or higher expected retention rate.

If for some reason the data center 160 were unavailable, the data center 150 may be selected as the data center with the next lowest average round-trip connection time. However, in certain embodiments, although the data center 150 has a lower round-trip connection time than the data center 170, the data center 170 may be selected because it is associated with a lower variance, which may indicate a more consistent connection for the group of users to the data center 170 compared to the data center 150.

Referring back to FIG. 1, in the non-limiting illustrated example, the data center 170 is located in Europe while data centers 150 and 160 are located in the United States. Moreover, observing the ping values in Table 1, it is likely that at least four of the users are located within the United States based on the lower ping values to the data servers 150 and 160 located in the United States. Thus, in some embodiments, the data center 170 may be omitted from consideration based at least in part on its geographic location. Further, it may be desirable to omit the data center 170 because, in this particular example, the number of network hops between each of the users and the data center 170 in Europe is likely to be greater than the number of network hops to any of the data centers within the United States due, for example, to its greater average geographic or network distance from the user computing systems compared to the data centers in the United States. It should be understood that the geographic location of the users need not be determined via the ping values, but may be identified by the IP address of the users or may be specified by the users.

In some embodiments, the data center 170 may be initially discarded as being associated with the highest average ping values. The data center may then be selected from the remaining data centers 150 and 160. In some cases, the data center 160 may be selected as being associated with the lowest average ping value. However, if a threshold of 30 ms is specified for identifying the data center with the lowest average ping value, then both the data centers 150 and 160 may satisfy the initial determination criteria because although the data center 160 has the lowest average ping value, the average ping value of the data center 150 is within 30 ms of the lowest average ping value. In some such cases, the server selector 138 may analyze the variance and/or standard deviation of the ping values to select the data center 160 over the data center 150.

Overview of Computing System

Figure 4:
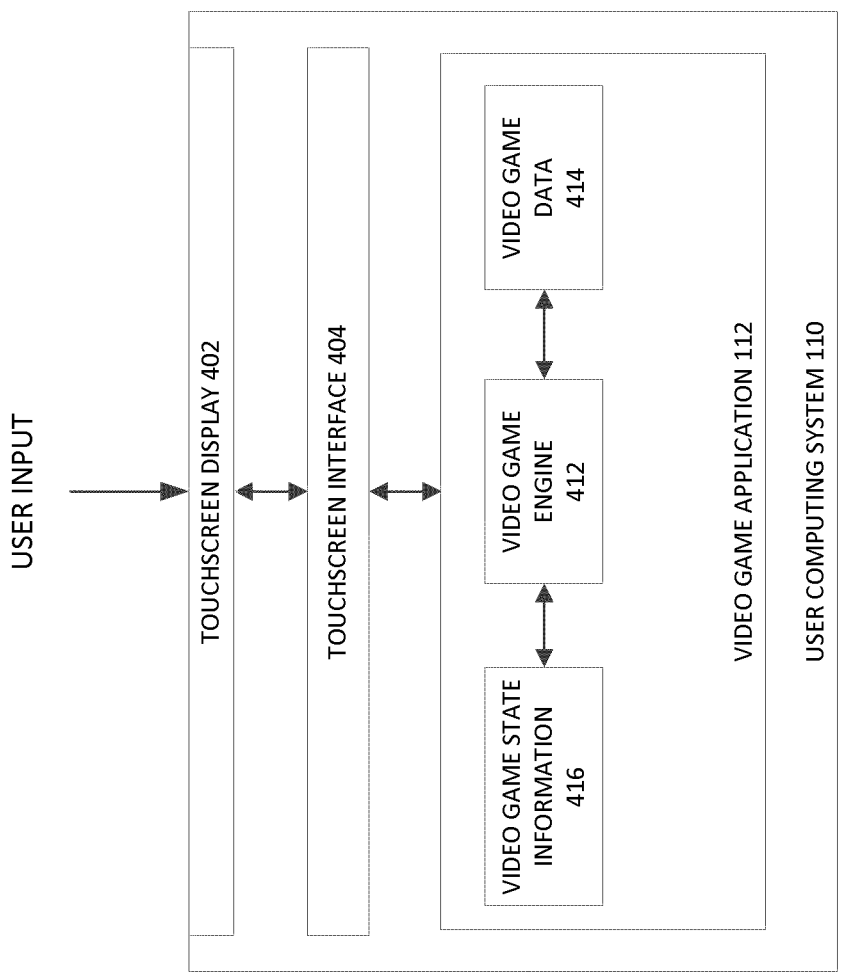
FIG. 4 illustrates an embodiment of a user computing system.

FIG. 4 illustrates an embodiment of a user computing system 110, which may also be referred to as a gaming system. Although FIG. 4 is specific to the user computing system 110, it should be understood that the user computing systems 114 and 116 may have the same or a similar configuration. Alternatively, one or more of the user computing systems 114 and 116 may have different configurations than each other and/or the user computing system 110. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 4, the user computing system 110 is a touch-capable computing device capable of receiving input from a user via a touchscreen display 402. However, the user computing system 110 is not limited as such and may include non-touch capable embodiments, which do not include a touchscreen display 402.

The user computing system 110 includes a touchscreen display 402 and a touchscreen interface 404, and is configured to execute a game application. This game application may be the video game 112 or an application that executes in conjunction with or in support of the video game 112, such as a video game execution environment. Although described as a game application 112, in some embodiments the application 112 may be another type of application that may be capable of interacting with multiple users across multiple user computing systems, such as educational software or language software. While user computing system 110 includes the touchscreen display 402, it is recognized that a variety of input devices may be used in addition to or in place of the touchscreen display 402.

The user computing system 110 can include one or more processors, such as central processing units (CPUs), graphics processing units (GPUs), and accelerated processing units (APUs). Further, the user computing system 110 may include one or more data storage elements. In addition, the user computing system 110 may include one or more volatile memory elements, such as random-access memory (RAM). In some embodiments, the user computing system 110 can be a specialized computing device created for the purpose of executing game applications 112. For example, the user computing system 110 may be a video game console. The game applications 112 executed by the user computing system 110 may be created using a particular application programming interface (API) or compiled into a particular instruction set that may be specific to the user computing system 110. In some embodiments, the user computing system 110 may be a general purpose computing device capable of executing game applications 112 and non-game applications. For example, the user computing system 110 may be a laptop with an integrated touchscreen display or desktop computer with an external touchscreen display. Components of an example embodiment of a user computing system 110 are described in more detail with respect to FIG. 5.

The touchscreen display 402 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 402. The touchscreen interface 404 can be configured to translate the touch input into data and output the data such that it can be interpreted by components of the user computing system 110, such as an operating system and the game application 112. The touchscreen interface 404 can translate characteristics of the tactile touch input touch into touch input data. Some example characteristics of a touch input can include, shape, size, pressure, location, direction, momentum, duration, and/or other characteristics. The touchscreen interface 404 can be configured to determine the type of touch input, such as, for example a tap (for example, touch and release at a single location) or a swipe (for example, movement through a plurality of locations on touchscreen in a single touch input). The touchscreen interface 404 can be configured to detect and output touch input data associated with multiple touch inputs occurring simultaneously or substantially in parallel. In some cases, the simultaneous touch inputs may include instances where a user maintains a first touch on the touchscreen display 402 while subsequently performing a second touch on the touchscreen display 402. The touchscreen interface 404 can be configured to detect movement of the touch inputs. The touch input data can be transmitted to components of the user computing system 110 for processing. For example, the touch input data can be transmitted directly to the game application 112 for processing.

In some embodiments, the touch input data can undergo processing and/or filtering by the touchscreen interface 404, an operating system, or other components prior to being output to the game application 112. As one example, raw touch input data can be captured from a touch input. The raw data can be filtered to remove background noise, pressure values associated with the input can be measured, and location coordinates associated with the touch input can be calculated. The type of touch input data provided to the game application 112 can be dependent upon the specific implementation of the touchscreen interface 404 and the particular API associated with the touchscreen interface 404. In some embodiments, the touch input data can include location coordinates of the touch input. The touch signal data can be output at a defined frequency. Processing the touch inputs can be computed many times per second and the touch input data can be output to the game application for further processing.

A game application 112 can be configured to be executed on the user computing system 110. The game application 112 may also be referred to as a video game, a game, game code and/or a game program. A game application should be understood to include software code that a user computing system 110 can use to provide a game for a user to play. A game application 112 might comprise software code that informs a user computing system 110 of processor instructions to execute, but might also include data used in the playing of the game, such as data relating to constants, images and other data structures. For example, in the illustrated embodiment, the game application includes a game engine 412, game data 414, and game state information 416. As previously stated, the embodiments described herein may be used for applications other than video games, such as educational software or videoconferencing. Thus, in some such cases, the game application 112 may be substituted with other types of applications that may involve multiple users communicating over a network and selecting a server, or one of the plurality of user computing systems, to act as a host.

The touchscreen interface 404 or another component of the user computing system 110, such as the operating system, can provide user input, such as touch inputs, to the game application 112. In some embodiments, the user computing system 110 may include alternative or additional user input devices, such as a mouse, a keyboard, a camera, a game controller, and the like. Further, the user computing system 110 may include a virtual reality display and/or an augmented reality display. A user can interact with the game application 112 via the touchscreen interface 404 and/or one or more of the alternative or additional user input devices. The game engine 412 can be configured to execute aspects of the operation of the game application 112 within the user computing system 110. Execution of aspects of gameplay within a game application can be based, at least in part, on the user input received, the game data 414, and game state information 416. The game data 414 can include game rules, prerecorded motion capture poses/paths, environmental settings, constraints, animation reference curves, skeleton models, and/or other game application information. Further, the game data 414 may include information that is used to set or adjust the difficulty of the game application 112.

The game engine 412 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 112, the game application 112 can store game state information 416, which can include character states, environment states, scene object storage, and/or other information associated with a state of execution of the game application 112. For example, the game state information 416 can identify the state of the game application at a specific point in time, such as a character position, character action, game level attributes, and other information contributing to a state of the game application.

The game engine 412 can receive the user inputs and determine in-game events, such as actions, collisions, runs, throws, attacks and other events appropriate for the game application 112. During operation, the game engine 412 can read in game data 414 and game state information 416 in order to determine the appropriate in-game events. In one example, after the game engine 412 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

In some cases, at least some of the videogame engine 412 may reside on a server, such as one of the videogame servers 152. Further, in some cases, the complete videogame engine 412 may reside on the server. Thus, in some cases, the videogame engine 412 may be omitted from the portion of the videogame application 112 hosted on the user computing system 110. Similarly, in some embodiments, videogame state information 416 and videogame data 414 may be hosted on a server in addition to or instead of on the user computing system 110. Further, in some cases, actions of the user performed within the video game application 112 may be transmitted to a server that is hosting a portion of the videogame 112. The server may compute or determine the result of the user's interaction with respect to the videogame application 112, such as collisions, attacks, or movements. The server may then send a result of the user's actions to the videogame application 112 on the user computing system 110. The videogame application 112 may then perform an action in response to the result, such as displaying the result to the user.

Example Hardware Configuration of Computing System

Figure 5:
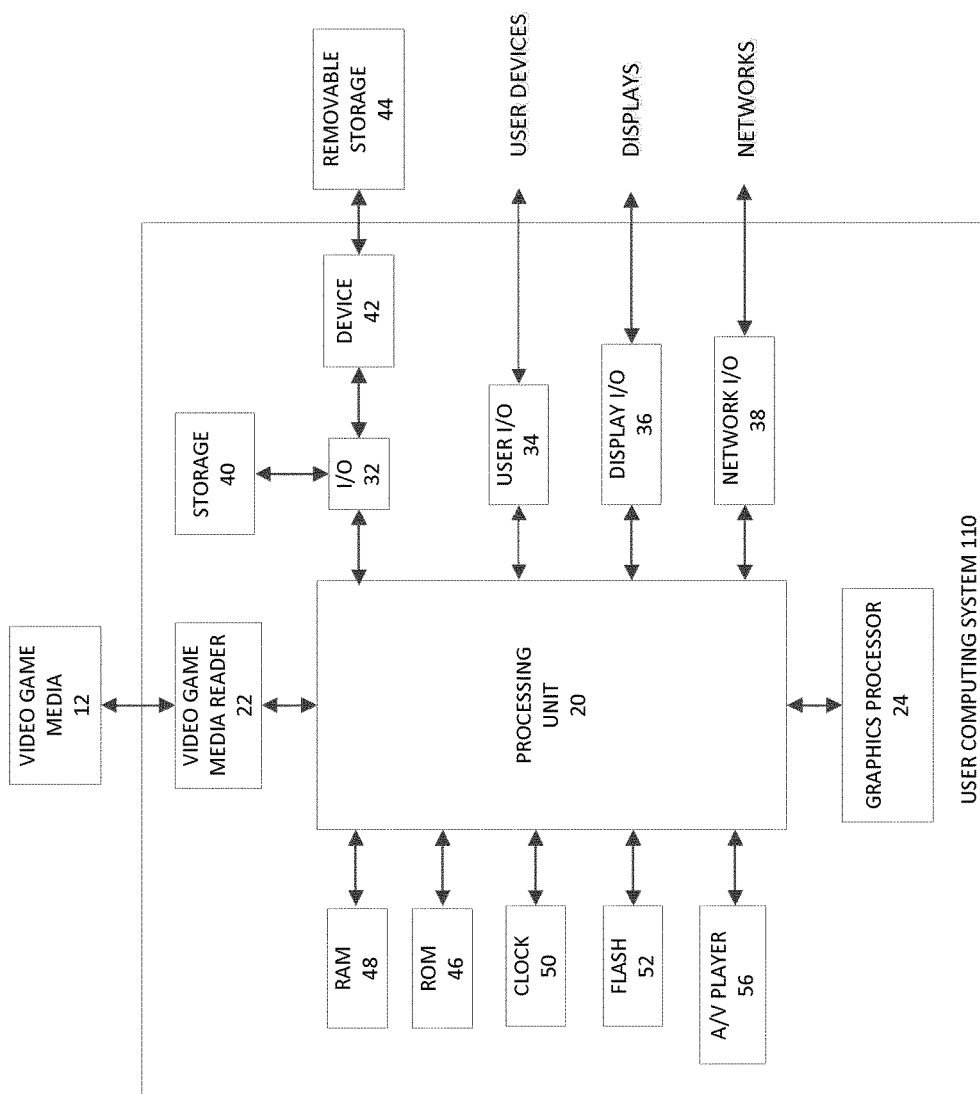
FIG. 5 illustrates an embodiment of a hardware configuration for the user computing system of FIG. 4.

FIG. 5 illustrates an embodiment of a hardware configuration for the user computing system 110 of FIG. 4. It should be understood that each of the user computing systems 114 and 116 may be configured similarly or the same as the user computing system 110. Alternatively, one or more of the user computing systems 114 and 116 may have different configurations than each other and/or the user computing system 110. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 5) as described with respect to FIG. 4, the user computing system 110 may optionally include a touchscreen display 402 and a touchscreen interface 404.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method of assessing network connections, the computer-implemented method comprising:
under control of one or more hardware computing devices configured with specific computer-executable instructions, the specific computer-executable instructions stored in an electronic hardware memory,
communicating over a network with a first user computing system associated with a first user,
receiving, from the first user computing system, a trigger instruction data packet comprising an electronic indication indicating a request by the first user to play an instance of a video game;
communicating with a physical data store, wherein the physical data store is configured to store game participant data structures storing information about users requesting to play the video game;
identifying a plurality of users to play the instance of the video game, each user of the plurality of users associated with a different user computing system of a plurality of user computing systems;
for each user of the plurality of users, accessing, from the physical data store, a connection statistics data packet storing network connection statistics for the user computing system associated with the user, the network connection statistics corresponding to at least one test communication performed with each data center of a plurality of data centers and the user computing system;
executing a first rules engine to generate a score for each data center of the plurality of data centers, each score based at least in part on an assessment of the network connection statistics associated with each user of the plurality of users and the data center;
executing a second rules engine to determine a selected data center from the plurality of data centers based at least in part on the score generated for each data center of the plurality of data centers;
generating a data center selection packet storing the selected data center, the data center selection packet configured for transmission to at least one user computing system of the plurality of user computing systems; and
transmitting the data center selection packet to a network interface for transmission to the at least one user computing system.

2. The computer-implemented method of claim 1, wherein the score for each data center is based at least in part on a mean value of a round trip time of a test packet between each user computing system of the plurality of user computing systems and the data center.

3. The computer-implemented method of claim 1, wherein the score for each data center is based at least in part on a variance of a round trip time of a test packet between each user computing system of the plurality of user computing systems and the data center.

4. The computer-implemented method of claim 1, further comprising selecting the plurality of data centers from a set of data centers based at least in part on a geographic location of at least one user computing system of the plurality of user computing systems.

5. The computer-implemented method of claim 1, wherein generating the score for each data center of the plurality of data centers comprises generating the score for a particular server at each data center, and wherein determining the selected data center comprises selecting the particular server at the selected data center.

6. The computer-implemented method of claim 1, wherein determining the selected the data center from the plurality of data centers comprises:
identifying a first data center associated with a lowest score;
identifying a second data center associated with a second lowest score;
determining whether the second lowest score is within a threshold difference of the lowest score; and
in response to the second lowest score being within the threshold difference of the lowest score, performing a secondary selection process to select one of the first data center or the second data center.

7. The computer-implemented method of claim 6, wherein the secondary selection process comprises determining whether a first average number of network hops between each user computing system of the plurality of user computing systems and the first data center or a second average number of network hops between each user computing system of the plurality of user computing systems and the second data center is lower.

8. The computer-implemented method of claim 1, further comprising:
receiving an identity of a user computing system of the plurality of user computing systems;
providing the user computing system with a network address for each of the plurality of data centers; and
causing the user computing system to perform the test communication with each data center of the plurality of data centers.

9. The computer-implemented method of claim 8, wherein, in response to detecting a trigger condition, causing the user computing system to repeat the test communication with each data center of the plurality of data centers.

10. The computer-implemented method of claim 1, further comprising initiating the instance of the video game with the plurality of users at the selected data center.

11. A system configured to assess network connections, the system comprising:
an electronic data store configured to store connection statistics for communication between a plurality of user computing systems and a plurality of data centers;
a hardware processor in communication with the electronic data store, the hardware processor configured to execute specific computer-executable instructions to at least:
communicate over a network with a user computing system associated with a user,
receive, from the user computing system, a trigger instruction data packet comprising an electronic indication indicating a request by the user to play an instance of a video game;
communicate with the electronic data store, wherein the electronic data store is further configured to store game participant data structures storing information about users requesting to play the video game;
identify a plurality of users to play the instance of the video game, each user of the plurality of users associated with a different user computing system of a plurality of user computing systems;

for each user of the plurality of users, access, from the electronic data store, a connection statistics data packet storing network connection statistics for the user computing system associated with the user, the network connection statistics corresponding to at least one test communication performed with each data center of a plurality of data centers and the user computing system;

execute a first rules engine to generate a score for each data center of the plurality of data centers, each score based at least in part on an assessment of the network connection statistics associated with each user of the plurality of users and the data center;

execute a second rules engine to determine a selected data center from the plurality of data centers based at least in part on the score generated for each data center of the plurality of data centers;

generate a data center selection packet storing the selected data center, the data center selection packet configured for transmission to at least one user computing system of the plurality of user computing systems; and transmit the data center selection packet to a network interface for transmission to the at least one user computing system.

12. The system of claim 11, wherein generating the score for each data center of the plurality of data centers comprises generating the score for a particular server at each data center, and wherein determining the selected data center comprises selecting the particular server at the selected data center.

13. The system of claim 11, wherein determining the selected the data center of the plurality of data centers comprises:
identifying a first data center associated with a lowest score;
identifying a second data center associated with a second lowest score;
determining whether the second lowest score is within a threshold difference of the lowest score; and
in response to the second lowest score being within the threshold difference of the lowest score, performing a secondary selection process to select one of the first data center or the second data center.

14. The system of claim 13, wherein the secondary selection process comprises determining whether a first average number of network hops between each user computing system of the plurality of user computing systems and the first data center or a second average number of network hops between each user computing system of the plurality of user computing systems and the second data center is lower.

15. The system of claim 11, wherein the hardware processor is further configured to execute specific computer-executable instructions to at least:
receive an identity of a user computing system of the plurality of user computing systems;
provide the user computing system with a network address for each of the plurality of data centers; and
cause the user computing system to perform the test communication with each data center of the plurality of data centers.

16. The system of claim 15, wherein the hardware processor is further configured to execute specific computer-executable instructions to at least:

receive from the user computing system a result of the test communication with each data center of the plurality of data centers; and
store the result at the electronic data store.

17. The system of claim 15, wherein the hardware processor is further configured to execute specific computer-executable instructions to at least:
detect a trigger condition; and
in response to detecting the trigger condition, cause the user computing system to repeat the test communication with each data center of the plurality of data centers.

18. A non-transitory computer-readable storage medium storing computer executable instructions for assessing network connections that, when executed by one or more computing devices, configure the one or more computing devices to perform operations comprising:
communicating over a network with a first user computing system associated with a first user,
receiving, from the first user computing system, a trigger instruction data packet comprising an electronic indication indicating a request by the first user to play an instance of a video game;
communicating with a physical data store, wherein the physical data store is configured to store game participant data structures storing information about users requesting to play the video game;
identifying a plurality of users to play the instance of the video game, each user of the plurality of users associated with a different user computing system of a plurality of user computing systems;
for each user of the plurality of users, accessing, from the physical data store, a connection statistics data packet storing network connection statistics for the user computing system associated with the user, the network connection statistics corresponding to at least one test communication performed with each data center of a plurality of data centers and the user computing system;
executing a first rules engine to generate a score for each data center of the plurality of data centers, each score based at least in part on an assessment of the network connection statistics associated with each user of the plurality of users and the data center;
executing a second rules engine to determine a selected data center from the plurality of data centers based at least in part on the score generated for each data center of the plurality of data centers;
generating a data center selection packet storing the selected data center, the data center selection packet configured for transmission to at least one user computing system of the plurality of user computing systems; and
transmitting the data center selection packet to a network interface for transmission to the at least one user computing system.

19. The computer-readable, non-transitory storage medium of claim 18, wherein determining the selected data center from the plurality of data centers comprises selecting the data center from a subset of the plurality of data centers, the score of each data center of the subset of the plurality of data centers within a threshold difference from a lowest score.

20. The computer-readable, non-transitory storage medium of claim 18, further comprising:
receiving an identity of a user computing system of the plurality of user computing systems;

providing the user computing system with a network address for each of the plurality of data centers; and
causing the user computing system to perform the test communication with each data center of the plurality of data centers.

* * * * *